United States Patent
Zhang et al.

(10) Patent No.: US 11,817,756 B2
(45) Date of Patent: Nov. 14, 2023

(54) ENHANCED ELECTRIC MOTOR USING PLANETARY GEAR

(71) Applicants: XUZHOU NANPU ELECTROMECHANICAL TECHNOLOGY CO., LTD., Fengxian (CN); Chaogang Zhang, Fengxian (CN)

(72) Inventors: Chaogang Zhang, Fengxian (CN); Yanfei Zhou, Jiangsu (CN); Yisong Teng, Fengxian (CN); Liye Zhang, Fengxian (CN)

(73) Assignees: Chaogang ZHANG, Jiangsu (CN); XUZHOU NANPU ELECTROMECHANICAL TECHNOLOGY CO., LTD., Jiangsu (CN)

( * ) Notice: Subject to any disclaimer, the term of this patent is extended or adjusted under 35 U.S.C. 154(b) by 501 days.

(21) Appl. No.: 17/277,743

(22) PCT Filed: Aug. 23, 2019

(86) PCT No.: PCT/CN2019/102154
§ 371 (c)(1),
(2) Date: Apr. 5, 2021

(87) PCT Pub. No.: WO2020/057321
PCT Pub. Date: Mar. 26, 2020

(65) Prior Publication Data
US 2021/0351683 A1  Nov. 11, 2021

(30) Foreign Application Priority Data

Sep. 21, 2018 (CN) .......................... 201811110754.7

(51) Int. Cl.
*H02K 41/06* (2006.01)
*H02K 7/116* (2006.01)

(52) U.S. Cl.
CPC ............. *H02K 41/06* (2013.01); *H02K 7/116* (2013.01)

(58) Field of Classification Search
CPC .............................. H02K 41/06; H02K 7/116
USPC ............................................ 310/46, 75 R, 83
See application file for complete search history.

(56) References Cited

FOREIGN PATENT DOCUMENTS

| CN | 202918118 U | * | 5/2013 |
| CN | 104753399 A | * | 7/2015 |
| CN | 108071769 A | * | 5/2018 |

* cited by examiner

*Primary Examiner* — Jose A Gonzalez Quinones
(74) *Attorney, Agent, or Firm* — CBM PATENT CONSULTING, LLC (57) ABSTRACT

A planetary gear type enhanced motor comprises a stator with stator teeth and a rotor with rotor teeth engaged with each other, wherein the stator and the rotor are arranged eccentrically, and an output shaft is coaxially arranged on a central shaft of the stator and connected with a central shaft of the rotor through a transmission piece; and the two sides of the teeth of the stator teeth and the rotor teeth are provided with magnets, when the rotor teeth are engaged with the stator teeth, the magnetism and the magnetic poles of the magnets are changed to generate magnetic force to drive the rotor to revolve around the central shaft of the stator while rotating around the central shaft of the rotor, so that the transmission piece converts the motion of the rotor into the power of the output shaft.

10 Claims, 9 Drawing Sheets

ENHANCED ELECTRIC MOTOR USING PLANETARY GEAR

TECHNICAL FIELD

The present invention belongs to the field of motors, and particularly relates to a planetary gear type enhanced motor.

BACKGROUND

Figure 1:
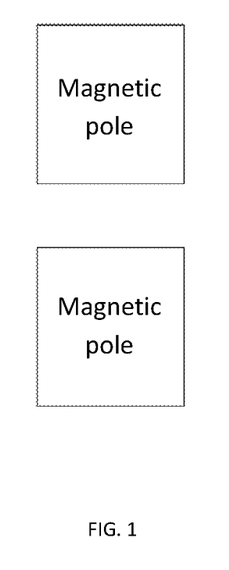
FIG. 1 is a schematic structural diagram of opposite magnetic poles.
Figure 2:
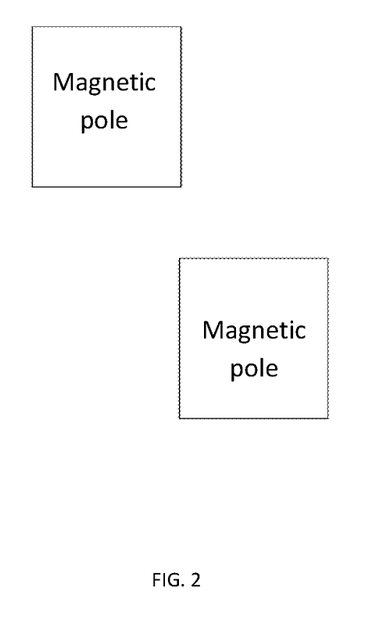
FIG. 2 is a schematic structural diagram of staggered magnetic poles.
Figure 3:
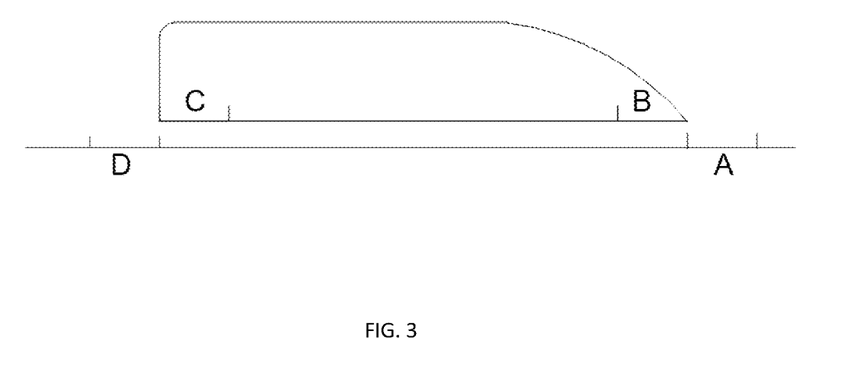
FIG. 3 is a schematic structural diagram of corresponding magnetic poles in a running state of a maglev train.

The existing motor has low power density and heavy weight because the two magnets generate magnetic force when the magnetic poles of the magnets are opposite to each other, as shown in FIGS. 1 and 2, which is larger than the magnetic force generated when the magnetic poles are staggered from each other, under the same other conditions. However, for the existing motors, both of the linear motor and the rotary motor, when the motors are operated by magnetic force, the magnetic poles are not opposed to each other, and thus a larger magnetic force cannot be generated, and finally, the magnitude of power is limited, so that the power for operating the motors cannot be optimized. Taking a linear motor used for driving a train to move forward on a maglev train as an example, when the train is required to move forward, a magnetic pole A of a magnet on a track in front of the train interacts with a magnetic pole B of a magnet on a head part of the train to generate a magnetic force F1, and a magnetic pole D of a magnet on a track on a rear part of the train interacts with a magnetic pole C of a magnet on a tail part of the train to generate a magnetic force F2, making the maglev train move forward under the combined action of F1 and F2, as shown in FIG. 3. Obviously, the magnetic poles generating the magnetic force for driving the linear motor to operate in this process are staggered from each other, which means that the magnetic poles cannot be opposed to each other, so that a larger magnetic force cannot be generated.

Therefore, it is desirable to solve the above problems.

SUMMARY

Objective: The present invention aims to provide a planetary gear type enhanced motor which can generate a larger magnetic force when the magnetic poles are opposite to each other, thereby increasing the power of the motor and improving the working efficiency.

Technical scheme: In order to achieve the above objective, the present invention discloses a planetary gear type enhanced motor comprising a stator with stator teeth and a rotor with rotor teeth engaged with each other, wherein the stator and the rotor are arranged eccentrically, and an output shaft is coaxially arranged on a central shaft of the stator and connected with a central shaft of the rotor through a transmission piece; and the two sides of the teeth of the stator teeth and the rotor teeth are provided with magnets, when the rotor teeth are engaged with the stator teeth, the magnetism and the magnetic poles of the magnets are changed to generate magnetic force to drive the rotor to revolve around the central shaft of the stator while rotating around the central shaft of the rotor, so that the transmission piece converts the motion of the rotor into the power of the output shaft.

The magnets are permanent magnets or electromagnets, at least one side of each of the two opposite magnets on the stator teeth and the rotor teeth is provided with an electromagnet capable of changing magnetism and magnetic poles, and the opposite magnets attract or repel each other to generate magnetic force to drive the rotor to move by controlling the magnetism and the magnetic poles of the electromagnets.

Furthermore, the stator is a gear disc fixed on a shell body and provided with an inner gear ring, the rotor is at least one gear internally engaged with the gear disc, the transmission piece is a connecting rod, one end of which is connected with the central shaft of the gear, and the other end of which is vertically connected with the output shaft and can rotate around the output shaft circumferentially, when the gear is engaged with the gear disc, the gear revolves around the central shaft of the gear disc while rotating around the central shaft of the gear, so that the connecting rod rotates around the output shaft to convert the revolution of the gear into the power of the output shaft.

Preferably, the electromagnets are connected with a controller used for controlling the magnetism and the magnetic poles of the electromagnets, the controller is connected with an angle sensor used for collecting an included angle between the connecting rod and the current engaged rotor tooth of the gear, and the controller controls the electromagnets based on angle information collected by the angle sensor.

Moreover, the stator is a gear disc fixed on a shell body and provided with an inner gear ring, the rotor is at least one gear internally engaged with the gear disc, the transmission piece is a transmission gear which is coaxially and fixedly connected with the output shaft and externally engaged with the gear, when the gear is engaged with the gear disc, the gear revolves around the central shaft of the gear disc while rotating around the central shaft of the gear, and drives the transmission gear to rotate around the output shaft at the same time, so that the transmission gear converts the revolution and rotation of the gear into the power of the output shaft.

Preferably, the electromagnets are connected with a controller used for controlling the magnetism and the magnetic poles of the electromagnets, the controller is connected with an angle sensor used for collecting an included angle between the connecting line of the center of the transmission gear and the center of the gear and the current engaged rotor tooth of the gear, and the controller controls the electromagnets based on angle information collected by the angle sensor.

Furthermore, the stator is a needle gear fixed on a shell body, the rotor is a cycloid gear internally engaged with the needle gear, the transmission piece is a coupling shaft, one end of which is connected with the output shaft and the other end of which is connected with the cycloid gear, when the cycloid gear is engaged with the needle gear, the cycloid gear revolves around the central shaft of the needle gear while rotating around the central shaft of the cycloid gear, and drives the coupling shaft to rotate at the same time, so that the coupling shaft converts the rotation of the cycloid gear into the power of the output shaft.

Moreover, the electromagnets are connected with a controller used for controlling the magnetism and the magnetic poles of the electromagnets, the controller is connected with an angle sensor used for collecting a rotation angle of the cycloid gear and controls the electromagnets based on angle information collected by the angle sensor.

Preferably, the needle gear comprises a needle gear mechanical layer and a needle gear magnet layer axially and fixedly connected with the needle gear mechanical layer, the cycloid gear comprises a cycloid mechanical layer and a cycloid magnet layer axially and fixedly connected with the cycloid mechanical layer, the needle gear mechanical layer is engaged with the cycloid mechanical layer, and a gap is arranged between the needle gear magnet layer and the cycloid magnet layer.

Moreover, the number of the rotors is at least 1.

Beneficial effects: the present invention has the following remarkable advantages compared with the prior art:

(1) compared with the traditional motor, the motor of the present invention has the advantages that the magnetic poles of the traditional motor are staggered, the magnetic poles of the motor disclosed herein are opposite, and the electromagnetic force which is multiple times of the original electromagnetic force can be generated under the same condition, so that the torque and the power of the motor are greatly improved; meanwhile, because the current required for generating the same electromagnetic force is smaller, the present invention can reduce the heat loss of the motor and improve the efficiency of the motor; and the motor has high power density, and the weight of the motor can be greatly reduced under the same condition, so that the motor is applied to the field of automobile shock absorption;

(2) the stator of the present invention adopts a gear disc, the rotor adopts a gear internally engaged with the rotor, a transmission piece is a connecting rod, a controller controls the magnetic poles and the magnetism of the electromagnets based on the information of an included angle between the connecting rod and the current engaged rotor tooth of the gear, so that the opposite magnets on the gear disc and the gear attract or repel each other to generate magnetic force to drive a driving gear to rotate around the central shaft of the gear disc while rotating around the central shaft of the gear, thereby enabling the connecting rod to rotate around the output shaft to convert the revolution of the gear into the power of the output shaft;

(3) the stator of the present invention adopts a gear disc, the rotor adopts a gear internally engaged with the rotor, a transmission piece is a transmission gear, a controller controls the magnetic poles and magnetism of the electromagnets based on the information of an included angle between the connecting line of the center of the transmission gear and the center of the gear and the current engaged rotor tooth of the gear, so that the opposite magnets on the gear disc and the gear attract or repel each other to generate magnetic force to drive the gear to be engaged with the gear disc, the gear revolves around the central shaft of the gear disc while rotating around the central shaft of the gear, and drives the transmission gear to rotate around the output shaft at the same time, so that the transmission gear converts the revolution and rotation of the gear into the power of the output shaft;

(4) the stator of the present invention adopts a needle gear, the rotor adopts a cycloid gear internally engaged with the needle gear, the transmission piece is a coupling shaft, magnets are arranged on the teeth of the needle gear and the cycloid gear, a controller controls the magnetic poles and the magnetism of the electromagnets based on the information of a rotation angle of the cycloid gear to drive the cycloid gear to rotate and be engaged with the needle gear, the cycloid gear revolves around the central shaft of the needle gear while rotating around the central shaft of the cycloid gear, and drives the coupling shaft to rotate to convert the rotation of the cycloid gear into the power of the output shaft; and the transmission part of the present invention has the speed reduction function with almost no energy loss caused in the speed reduction process; and (5) the needle gear of the present invention comprises a needle gear mechanical layer and a needle gear magnet layer axially and fixedly connected with the needle gear mechanical layer, the cycloid gear comprises a cycloid mechanical layer and a cycloid magnet layer axially and fixedly connected with the cycloid mechanical layer, wherein the needle gear mechanical layer is engaged with the cycloid mechanical layer to achieve radial fixation, a gap is arranged between the needle gear magnet layer and the cycloid magnet layer, and magnetic force is generated to drive the cycloid gear to rotate when the needle gear magnet layer and the cycloid magnet layer are engaged.

DETAILED DESCRIPTION

The technical scheme of the present invention is further described below with reference to the drawings.

EXAMPLE 1

Figure 4:
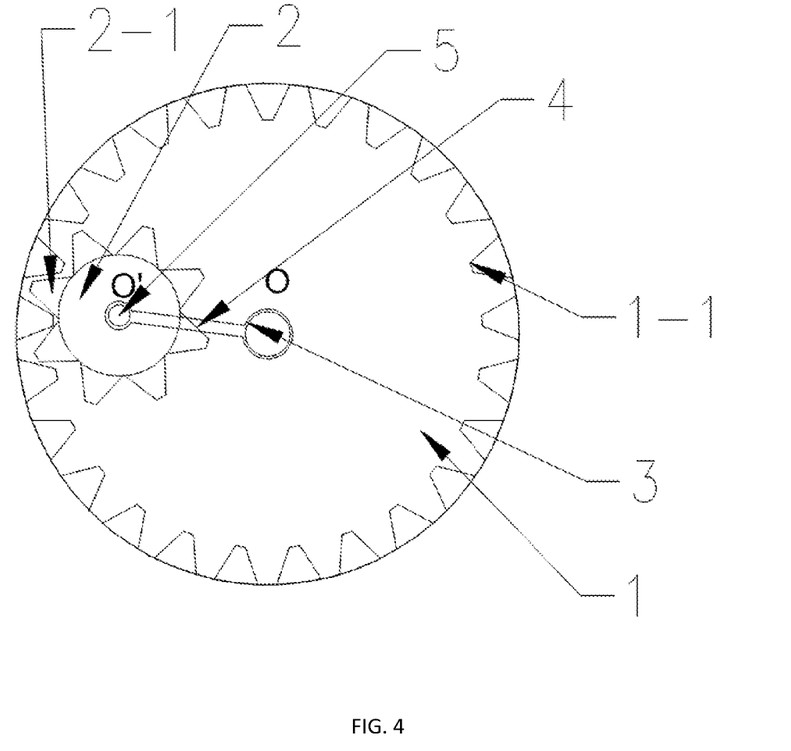
FIG. 4 is a schematic structural diagram according to Example 1 of the present invention.

As shown in FIG. 4, the planetary gear type enhanced motor of the present invention comprises a stator and a rotor arranged eccentrically, and the centers of the rotor and the stator are located on the same plane. The number of the rotors is at least 1 and also can be set to a plurality, and a plurality of rotors are uniformly arranged along the circumferential direction. The stator is a gear disc 1 fixed on a shell body and provided with an inner gear ring, the rotor is at least one gear 2 internally engaged with the gear disc, and a plurality of gears can be arranged along the circumferential direction of the gear disc in order to improve the power of the motor. Stator teeth 1-1 are arranged on the inner gear ring on the gear disc, rotor teeth 2-1 are arranged on an outer ring of the gear 2, and the rotor teeth 2-1 can be internally engaged with the stator teeth 1-1. An output shaft 3 is coaxially arranged on the central shaft of the gear disc 1, a connecting rod 4 capable of rotating around the output shaft 3 circumferentially is vertically connected with the output shaft 3, and the other end of the connecting rod 4 is connected with a central shaft 5 of the gear 2.

The two sides of the teeth of the stator teeth 1-1 and the rotor teeth 2-1 are provided with magnets, the stator teeth 1-1 on the gear disc 1 and the rotor teeth 2-1 on the gear 2 are teeth with a hollow structure, and the inside of the two sides of the teeth with the hollow structure is filled with magnets; or the stator teeth 1-1 on the gear disc 1 and the rotor teeth 2-1 on the gear 2 are of a solid structure, and the two sides of the teeth with the solid structure are fixedly connected with magnets.

The magnets of the present invention can be permanent magnets or electromagnets, at least one side of each of the two opposite magnets on the stator teeth and the rotor teeth is provided with an electromagnet capable of changing the magnetism and the magnetic poles, and the opposite magnets attract or repel each other to generate magnetic force to drive the rotor to move by controlling the magnetism and the magnetic poles of the electromagnets. The electromagnets are connected with a controller used for controlling the magnetism and the magnetic poles of the electromagnets, the controller is connected with an angle sensor used for collecting an included angle between the connecting rod 4 and the current engaged rotor tooth of the gear 2, and the controller controls the electromagnets based on angle information collected by the angle sensor. The magnet on the stator teeth 1-1 is an electromagnet, and the magnet on the rotor teeth 2-1 is a permanent magnet; or the magnet on the stator teeth 1-1 is an electromagnet, and the magnet on the rotor teeth 2-1 is an electromagnet; or the magnet on the stator teeth 1-1 is a permanent magnet, and the magnet on the rotor teeth 2-1 is an electromagnet.

When the rotor tooth is engaged with the stator teeth, the angle sensor transmits the collected information of an included angle between the connecting rod 4 and the current engaged rotor tooth of the gear 2 to the controller, and the controller controls the magnetism and magnetic poles of the electromagnets according to the angle information, so that the opposite magnets on the gear disc 1 and the gear 2 attract or repel each other to generate magnetic force to drive the gear 2 to revolve around the central shaft O of the gear disc 1 while rotating around the central shaft O' of the gear 2, thereby enabling the connecting rod 4 to rotate around the output shaft to convert the revolution of the gear 2 into the power of the output shaft 3.

Figure 5:
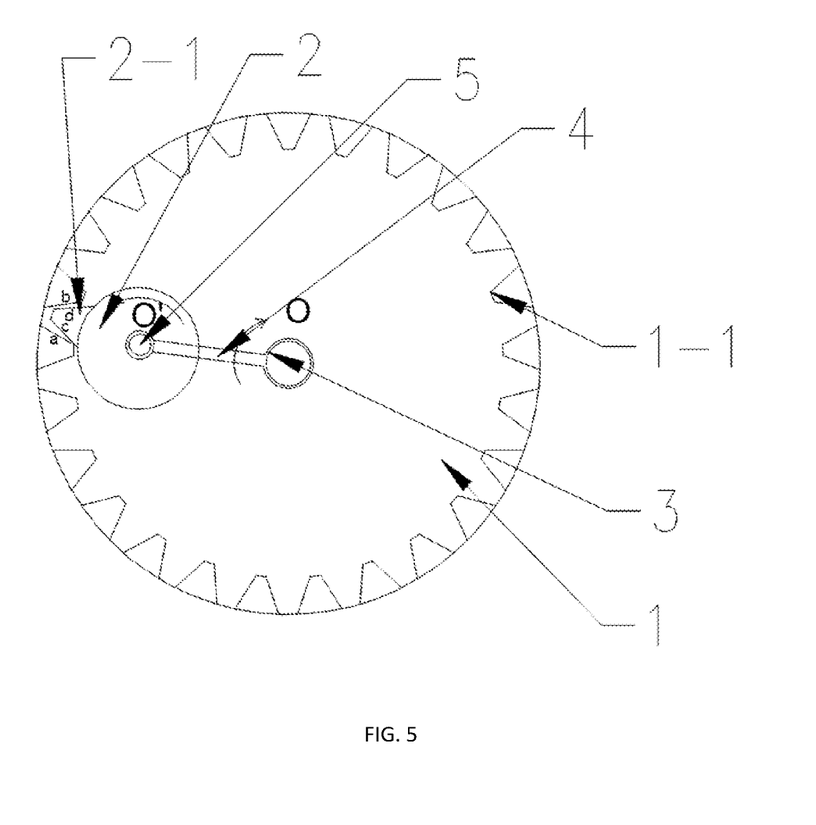
FIG. 5 is a schematic structural diagram in which a stator and a rotor are in contact according to Example 1 of the present invention.
Figure 6:
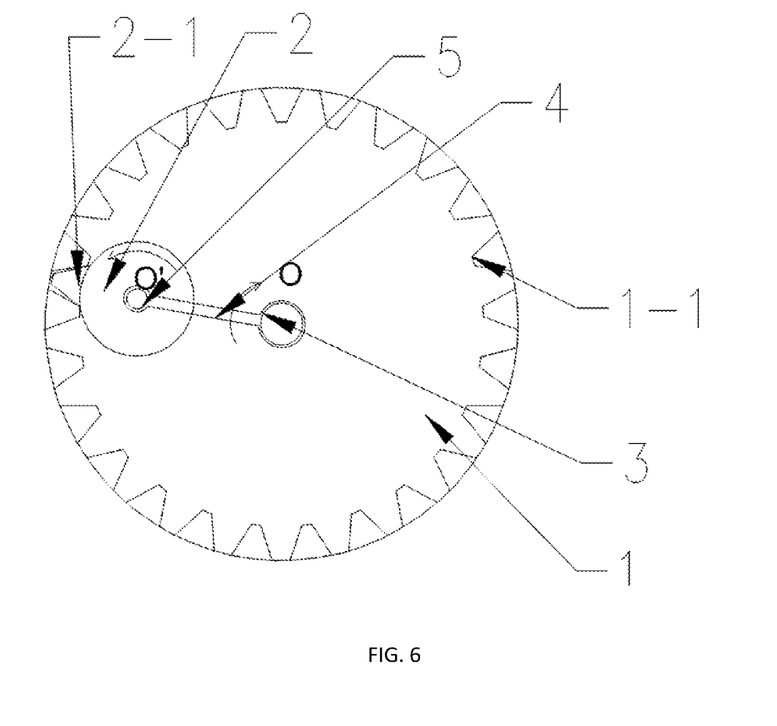
FIG. 6 is a schematic structural diagram in which a stator and a rotor are completely engaged according to Example 1 of the present invention.
Figure 7:
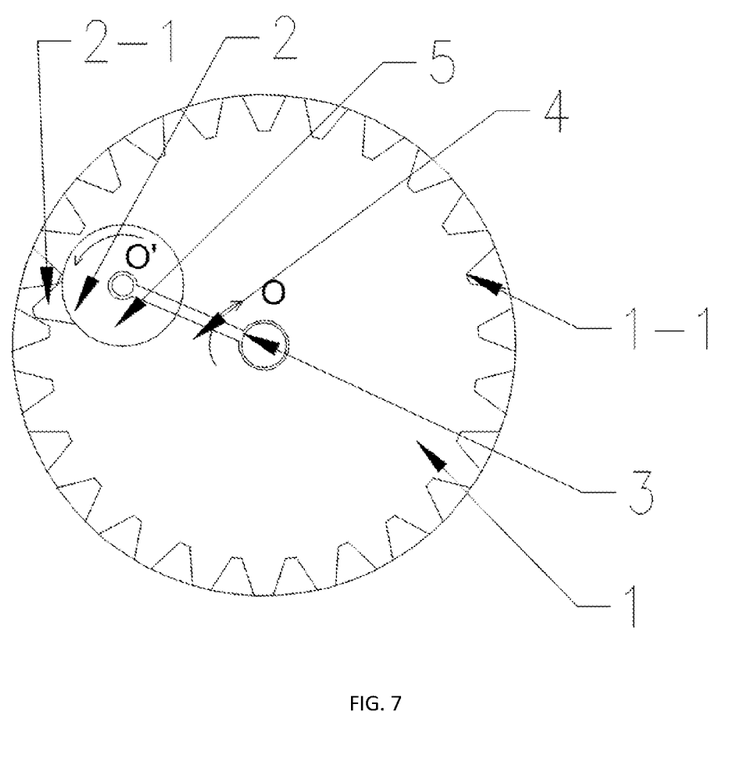
FIG. 7 is a schematic structural diagram in which a stator and a rotor are disconnected according to Example 1 of the present invention.

The present invention takes the fact that the magnet on the stator teeth 1-1 is an electromagnet, the magnet on the rotor teeth 2-1 is a permanent magnet, and the gear 2 rotates counterclockwise, thereby driving the connecting rod 4 to rotate clockwise, as an example, for any one rotor tooth 2-1 in the gear 2, the process from the contact of the rotor tooth 2-1 and the stator teeth 1-1 on the gear disc 1 to the complete engaging to the disconnection is shown in FIGS. 5 to 7. When a certain rotor tooth 2-1 of the gear 2 is completely engaged with the gear disc 1, an included angle between the connecting rod 4 and the rotor tooth 2-1 of the gear 2 is set to be 0; and when the rotor tooth 2-1 of the gear 2 is in contact with or is about to be disconnected from the stator tooth 1-1 of the gear disc 1, an included angle is generated between the rotor tooth 2-1 and the connecting rod 4, and the angle sensor transmits the collected information of an included angle between the connecting rod 4 and the rotor tooth 2-1 of the gear 2 to the controller, thereby controlling the on-off of the stator teeth 1-1 of the gear disc 1 to change the magnetism and the magnetic poles of the stator teeth 1-1.

FIG. 5 shows the contact of the rotor tooth 2-1 and the stator teeth 1-1, FIG. 6 shows the complete engaging of the rotor tooth 2-1 and the stator teeth 1-1, and FIG. 7 shows the disconnection of the rotor tooth 2-1 and the stator teeth 1-1. In the present invention, a, b, c, d are used to represent the side surfaces of the teeth on the gear and the gear disc, respectively. As shown in FIG. 5, the rotor tooth 2-1 on the gear 2 and the stator teeth 1-1 of the gear disc 1 start to be in contact, a corresponding included angle is generated between the connecting rod 4 and the rotor tooth 2-1, the controller controls an electromagnet on a side a of the stator tooth 1-1 to be powered on based on the information of the angle sensor and enables the magnetic pole on the side a to be different from the magnetic pole on a side c, so that the electromagnets on the side a and the side c generate mutual attraction force to drive the gear 2 to rotate in the counterclockwise direction; and an electromagnet on a side b is not powered on without magnetism in the process of rotating from the location of FIG. 5 to the location of FIG. 6. When the gear 2 is located at the location of FIG. 6, the electromagnet on the side a is powered off and loses magnetism, the electromagnet on the side b is powered on, and the magnetic pole on the side b is the same as that on a side d, so that the electromagnets on the side b and the side d generate mutual repulsive force to continuously drive the gear 2 to rotate anticlockwise to the location of FIG. 7; and when the gear 2 continuously rotates anticlockwise on the basis of the location of FIG. 7, the side b and the side d are disconnected, a corresponding included angle is generated between the connecting rod 4 and the rotor tooth 2-1, and the controller controls the electromagnet on the side b to be powered off and lose magnetism. For the gear 2 and the gear disc 1, because the rotor tooth is always engaged with the stator teeth at any time, according to the stress analysis of the gear 2 in FIGS. 5, 6 and 7, the gear 2 is always stressed to continuously rotate in the counterclockwise direction, thereby driving the connecting rod 4 to continuously rotate in the clockwise direction, and the power is output through the output shaft 3.

The motor of the present invention converts electric energy into kinetic energy, and can also be used in reverse on the basis of the present invention, which means that kinetic energy is converted into electric energy by designing an enhanced generator with the structure of the present invention.

EXAMPLE 2

Figure 8:
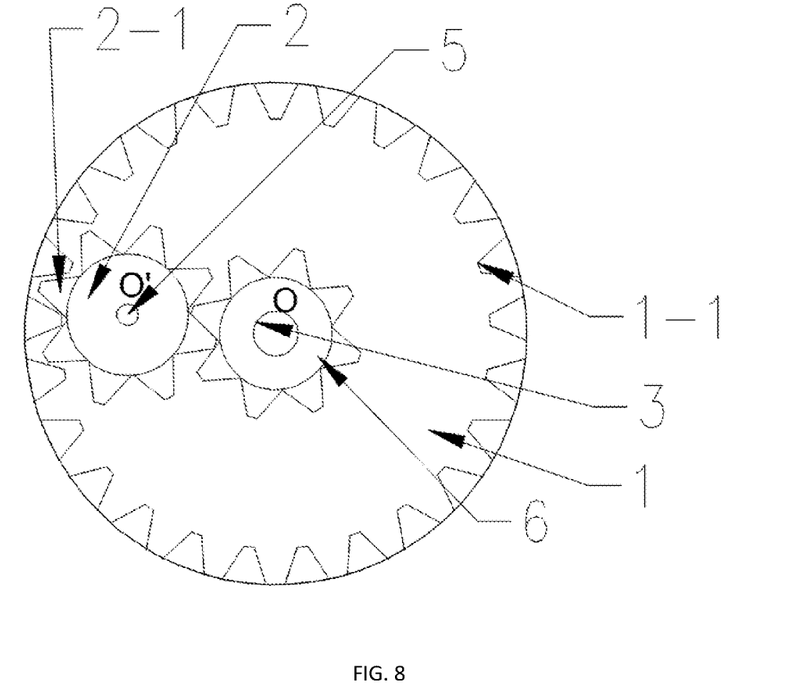
FIG. 8 is a schematic structural diagram according to Example 2 of the present invention.

As shown in FIG. 8, Example 2 has the same structure as Example 1, but the difference is that, without the connecting rod 4, a transmission gear 6 is coaxially and fixedly connected with the output shaft 3, the transmission gear 6 is externally engaged with the gear 2, when the gear 2 is engaged with the gear disc 1, the gear 2 revolves around the central shaft of the gear disc 1 while rotating around the central shaft of the gear 2, and drives the transmission gear 6 to rotate around the output shaft 3 at the same time, so that the transmission gear 6 converts the revolution and rotation of the gear 2 into the power of the output shaft 3. An angle sensor of Example 2 is used for collecting information of an included angle between a connecting line of the center of the transmission gear and the center of the gear and a current engaged rotor tooth of the gear, a controller is connected with the electromagnets and controls the electromagnets based on the angle information collected by the angle sensor.

EXAMPLE 3

Figure 9:
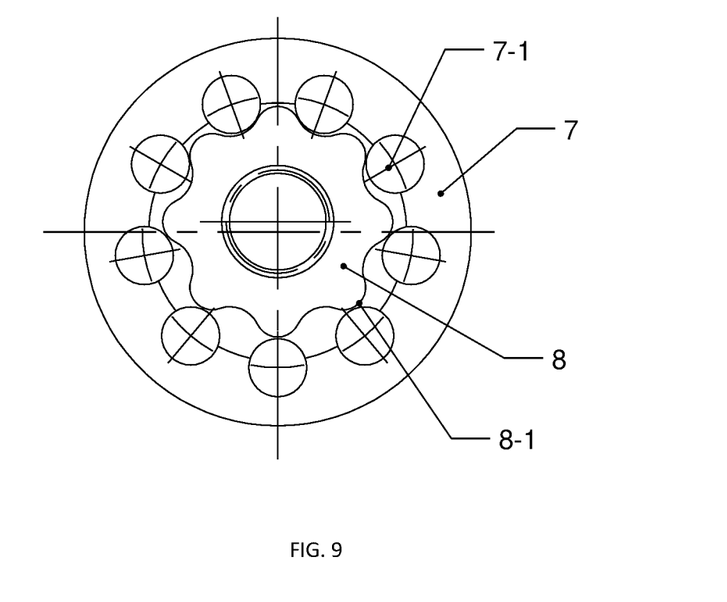
FIG. 9 is a schematic structural diagram according to Example 3 of the present invention.
Figures 10, 11:
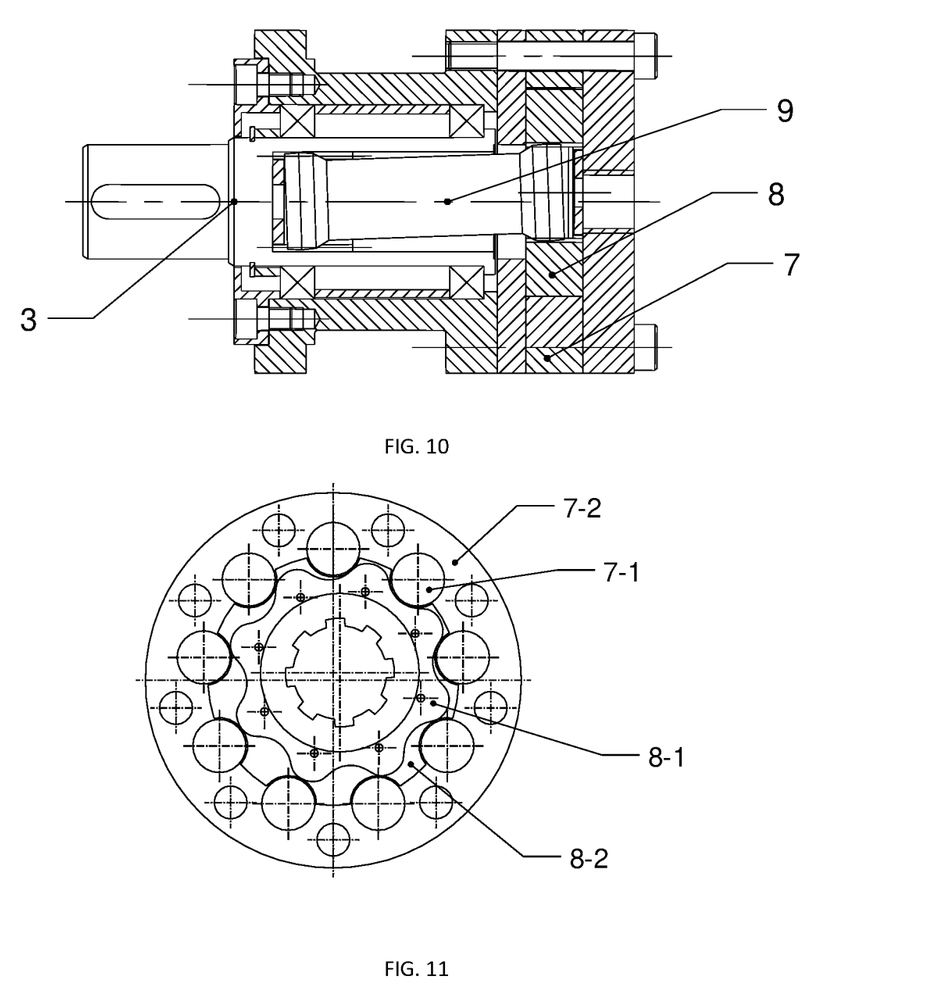
FIG. 10 is a sectional view according to Example 3 of the present invention.
FIG. 11 is a front view of a stator and a rotor according to Example 3 of the present invention.

As shown in FIGS. 9 and 10, in Example 3, the stator is a needle gear 7 fixed on a shell body, the rotor is a cycloid gear 8 internally engaged with the needle gear 7, and the transmission piece is a coupling shaft 9. Stator teeth, namely needle teeth 7-1, are arranged on an inner gear ring on the needle gear 7, rotor teeth, namely cycloid teeth 8-1, are arranged on an outer ring of the cycloid gear 8, and the needle teeth 7-1 can be internally engaged with the cycloid teeth 8-1. An output shaft 3 is coaxially arranged on a central shaft of the needle gear 7, splines are evenly arranged at two ends of the coupling shaft 9, the spline at the right end is connected with a spline in an inner hole of the cycloid gear 8, and the spline at the left end is connected with a spline in an inner hole of the output shaft 3.

Figure 12:
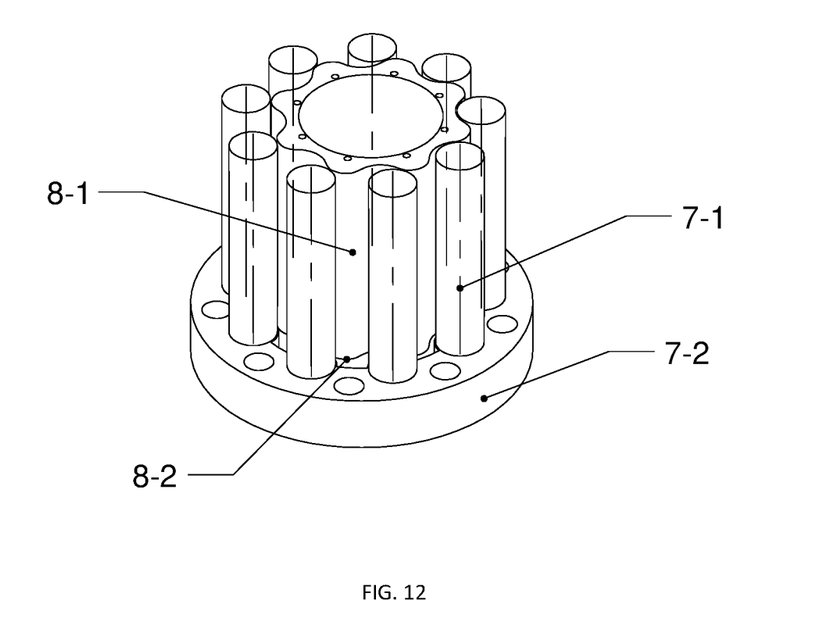
FIG. 12 is a schematic structural diagram of a stator and a rotor according to Example 3 of the present invention.

As shown in FIGS. 11 and 12, magnets are arranged on two sides of the teeth of the needle teeth 7-1 and the cycloid teeth 8-1, and the needle gear 7 in Example 3 comprises a needle gear mechanical layer and a needle gear magnet layer axially and fixedly connected with the needle gear mechanical layer, that is, a needle gear ring 7-2 of the needle gear 7 is of a mechanical layer structure, and the needle teeth 7-1 are of a magnet layer structure. The cycloid gear 8 comprises a cycloid mechanical layer and a cycloid magnet layer axially and fixedly connected with the cycloid mechanical layer, that is, a cycloid gear ring 8-2 is of a mechanical layer structure, and the cycloid teeth 8-1 are of a magnet layer structure. The needle gear ring 7-2 is engaged with the cycloid gear ring 8-2 to achieve radial fixation, the needle teeth 7-1 and the cycloid teeth 8-1 are engaged approximately with an air gap arranged therebetween, and magnets generate mutual magnetic force to drive the cycloid gear to rotate during engaging. The magnet layer structures of the needle teeth 7-1 and the cycloid teeth 8-1 can be teeth with a hollow structure or teeth with a solid structure, wherein the inside of the two sides of the teeth with the hollow structure is filled with magnets, and the two sides of the teeth with the solid structure are fixedly connected with magnets. The magnets of the present invention can be permanent magnets or electromagnets, and at least one side of each of the two opposite magnets on the needle teeth 7-1 and the cycloid teeth 8-1 is provided with an electromagnet capable of changing the magnetism and the magnetic poles, and the opposite magnets attract or repel each other to generate magnetic force to drive the rotor to move by controlling the magnetism and the magnetic poles of the electromagnets. The electromagnets are connected with a controller used for controlling the magnetism and the magnetic poles of the electromagnets, the controller is connected with an angle sensor used for collecting a rotation angle of the cycloid gear and controls the electromagnets based on angle information collected by the angle sensor. The magnet on the needle teeth 7-1 is an electromagnet, and the magnet on the cycloid teeth 8-1 is a permanent magnet; or the magnet on the needle teeth 7-1 is an electromagnet, and the magnet on the cycloid teeth 8-1 is an electromagnet; or the magnet on the needle teeth 7-1 is a permanent magnet, and the magnet on the cycloid teeth 8-1 is an electromagnet.

When the needle teeth 7-1 are engaged with the cycloid teeth 8-1, the angle sensor transmits the collected information of a rotation angle of the cycloid gear 8 to the controller, the controller controls the magnetism and the magnetic poles of the electromagnets based on the angle information, so that opposite magnets on the needle gear 7 and the cycloid gear 8 attract or repel each other to generate magnetic force to drive the cycloid gear 8 to revolve around the central shaft of the needle gear 7 while rotating around the central shaft of the cycloid gear 8, and drives the coupling shaft 9 to rotate at the same time, so that the coupling shaft 9 converts the rotation of the cycloid gear 8 into the power of the output shaft 3.

Figure 13:
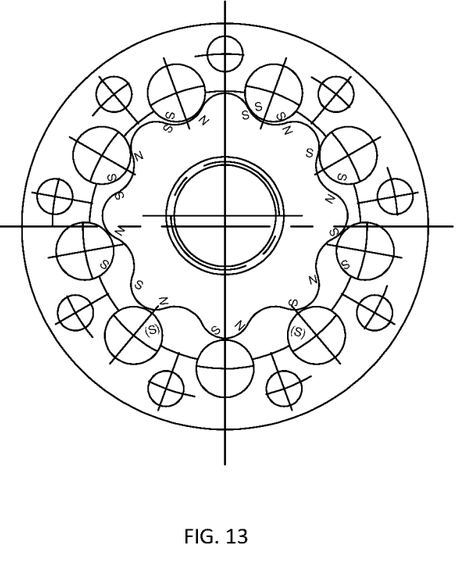
FIG. 13 is a magnetic pole distribution diagram I when a rotor rotates according to Example 3 of the present invention.
Figure 14:
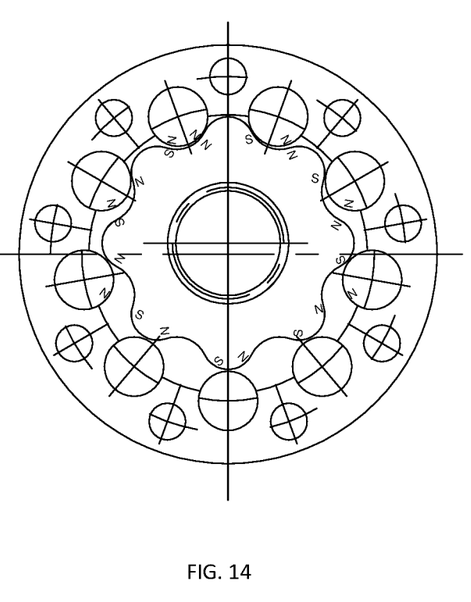
FIG. 14 is a magnetic pole distribution diagram II when a rotor rotates according to Example 3 of the present invention.
Figure 15:
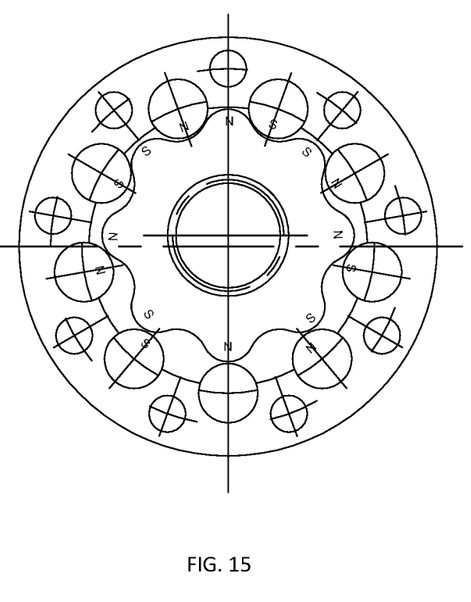
FIG. 15 is a magnetic pole distribution diagram III when a rotor rotates according to Example 3 of the present invention.

Taking the cycloid teeth 8-1 of the cycloid gear 8 as the permanent magnets and the needle teeth 7-1 of the needle gear 7 as the electromagnets as an example, when the arrangement of the magnetic poles of the permanent magnets on the cycloid gear is as shown in FIG. 13, if the cycloid gear 8 is set to rotate counterclockwise, the magnetic pole attributes of the electromagnets participating in the work on the needle gear are as shown in FIG. 13, and the magnetic pole attributes are all S poles as long as the electromagnets on the needle gear participate in the work. When the arrangement of the magnetic poles of the permanent magnets on the cycloid gear is as shown in FIG. 14, if the cycloid gear 8 is set to rotate clockwise, the magnetic pole attributes of the electromagnets participating in the work on the needle gear are as shown in FIG. 14; and the magnetic pole attributes are all N poles as long as the electromagnets on the needle gear participate in the work. When the arrangement of the magnetic poles of the permanent magnets on the cycloid gear is as shown in FIG. 15, that is, the magnetic poles on the left and right sides of the same cycloid tooth 8-1 have the same attribute, if the cycloid gear 8 is set to rotate clockwise, the magnetic pole attributes of the electromagnets on the needle gear participating in the work is as shown in FIG. 15, with the magnetic poles on the two sides of the electromagnet on the same needle tooth 7-1 having the same attribute.

In this example, the number of rotor teeth of the cycloid gear is 8, the number of stator teeth of the needle gear is 9, and the power generated by the rotation of the cycloid gear is directly transmitted to the output shaft through the coupling shaft. The output shaft rotates ⅛ circle in the opposite direction every revolution of the cycloid gear, so that the transmission part is equivalent to a reducer, with amplified torque and extremely small mechanical losses. The transmission part has a structure and a principle similar to those of the transmission part of the existing cycloid hydraulic motor.

What is claimed is:

1. A planetary gear type enhanced motor, comprising a stator with stator teeth and a rotor with rotor teeth engaged with each other, wherein the stator and the rotor are arranged eccentrically, and an output shaft is coaxially arranged on a central shaft of the stator and connected with a central shaft of the rotor through a transmission piece; and the two sides of the teeth of the stator teeth and the rotor teeth are provided with magnets, when the rotor teeth are engaged with the stator teeth, the magnetism and the magnetic poles of the magnets are changed to generate magnetic force to drive the rotor to revolve around the central shaft of the stator while rotating around the central shaft of the rotor, so that the transmission piece converts the motion of the rotor into the power of the output shaft.

2. The planetary gear type enhanced motor according to claim 1, wherein the magnets are permanent magnets or electromagnets, at least one side of each of the two opposite magnets on the stator teeth and the rotor teeth is provided with an electromagnet capable of changing magnetism and magnetic poles, and the opposite magnets attract or repel each other to generate magnetic force to drive the rotor to move by controlling the magnetism and the magnetic poles of electromagnets.

3. The planetary gear type enhanced motor according to claim 2, wherein the stator is a gear disc fixed on a shell body and provided with an inner gear ring, the rotor is at least one gear internally engaged with the gear disc, the transmission piece is a connecting rod, one end of which is connected with the central shaft of the gear, and the other end of which is vertically connected with the output shaft and can rotate around the output shaft circumferentially, when the gear is engaged with the gear disc, the gear revolves around the central shaft of the gear disc while rotating around the central shaft of the gear, so that the connecting rod rotates around the output shaft to convert the revolution of the gear into the power of the output shaft.

4. The planetary gear type enhanced motor according to claim 3, wherein the electromagnets are connected with a controller used for controlling the magnetism and the magnetic poles of the electromagnets, the controller is connected with an angle sensor used for collecting an included angle between the connecting rod and the current engaged rotor tooth of the gear, and the controller controls the electromagnets based on angle information collected by the angle sensor.

5. The planetary gear type enhanced motor according to claim 2, wherein the stator is a gear disc fixed on a shell body and provided with an inner gear ring, the rotor is at least one gear internally engaged with the gear disc, the transmission piece is a transmission gear which is coaxially and fixedly connected with the output shaft and externally engaged with the gear, when the gear is engaged with the gear disc, the gear revolves around the central shaft of the gear disc while rotating around the central shaft of the gear, and drives the transmission gear to rotate around the output shaft at the same time, so that the transmission gear converts the revolution and rotation of the gear into the power of the output shaft.

6. The planetary gear type enhanced motor according to claim 5, wherein the electromagnets are connected with a controller used for controlling the magnetism and the magnetic poles of the electromagnets, the controller is connected with an angle sensor used for collecting an included angle between the connecting line of the center of the transmission gear and the center of the gear and the current engaged rotor tooth of the gear, and the controller controls the electromagnets based on angle information collected by the angle sensor.

7. The planetary gear type enhanced motor according to claim 2, wherein the stator is a needle gear fixed on a shell body, the rotor is a cycloid gear internally engaged with the needle gear, the transmission piece is a coupling shaft, one end of which is connected with the output shaft and the other end of which is connected with the cycloid gear, when the cycloid gear is engaged with the needle gear, the cycloid gear revolves around the central shaft of the needle gear while rotating around the central shaft of the cycloid gear, and drives the coupling shaft to rotate at the same time, so that the coupling shaft converts the rotation of the cycloid gear into the power of the output shaft.

8. The planetary gear type enhanced motor according to claim 7, wherein the electromagnets are connected with a controller used for controlling the magnetism and the magnetic poles of the electromagnets, the controller is connected with an angle sensor used for collecting a rotation angle of the cycloid gear and controls the electromagnets based on angle information collected by the angle sensor.

9. The planetary gear type enhanced motor according to claim 7, wherein the needle gear comprises a needle gear mechanical layer and a needle gear magnet layer axially and fixedly connected with the needle gear mechanical layer, the cycloid gear comprises a cycloid mechanical layer and a cycloid magnet layer axially and fixedly connected with the cycloid mechanical layer, the needle gear mechanical layer is engaged with the cycloid mechanical layer, and a gap is arranged between the needle gear magnet layer and the cycloid magnet layer.

10. The planetary gear type enhanced motor according to claim 1, wherein the number of the rotors is at least 1.

* * * * *